Patented May 5, 1953

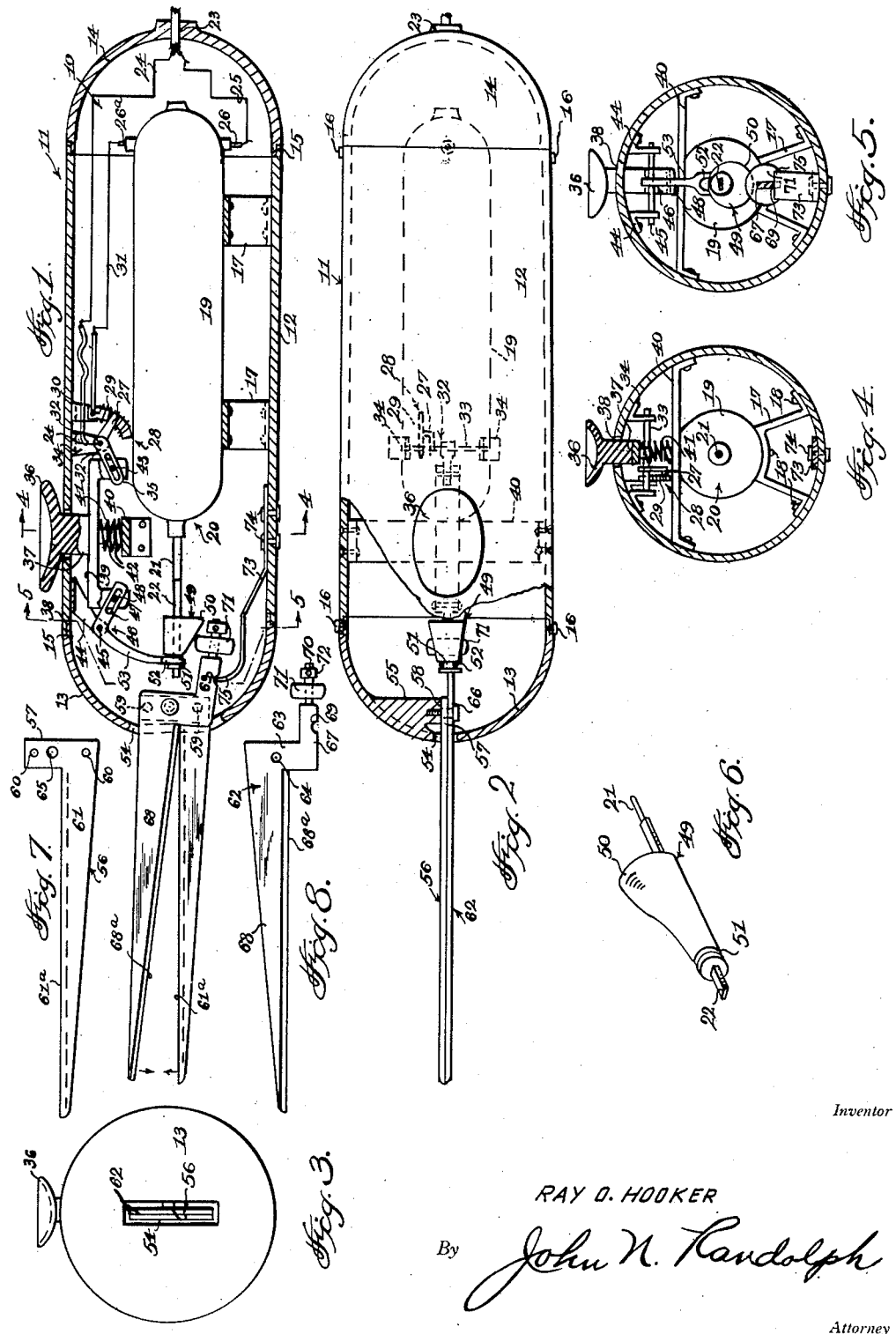

2,637,103

UNITED STATES PATENT OFFICE 2,637,103

ELECTRIC SHEARS

Ray O. Hooker, San Fernando, Calif.

Application February 15, 1952, Serial No. 271,803

8 Claims. (Cl. 30—228)

This invention relates to a novel construction of electric shears or scissors.

A primary object of the present invention is to provide an electric shears or scissors having a single manual'y actuated control for stopping, starting and regulating the speed of a motor and for causing the blades of the shears to be actuated by an element connected to the motor shaft, and wherein the extent that the shear blade is moved by the e'ement connected to the motor shaft will vary depending upon the speed that the motor is driven.

Another object of the invention is to provide a control unit wherein the motor can be initially started and operated at a low speed without actuation of the blades by the parts connected to the motor shaft to relieve the motor of the load imparted thereto in actuating the shear blade during the starting of the motor and the initial acceleration thereof.

Another object of the invention is to provide an electric shears wherein the element connected to the motor shaft will function to move the shear blade, actuated thereby, to an open position and to thereafter permit the shear blade to return under a spring biasing action to a closed position, the extent that the shear blade is swung toward an open position increasing as the speed of operation of the motor increases.

Another object of the invention is to provide an electric shears or scissors including a movable shear blade which is spring urged to a closed position limiting the possibility of damage to the shears in the event that the blades strike an obstruction preventing completion of the cutting stroke.

Still a further object of the invention is to provide an electric shears of extremely simple construction which may be manually supported in one hand and manually controlled with the thumb or finger of the hand supporting the shears to vary the speed of operation of the shears and the extent of opening of the shears.

Still a further object of the invention is to provide an electric shears which is extremely compact yet which will be sufficiently durable for efficiently accomplishing its intended results.

Various other objects and advantages of the invention will hereinafter become more fully apparent from the following description of the drawing, illustrating a presently preferred embodiment thereof, and wherein:

Figure 1 is a longitudinal vertical sectional view, partly in side elevation illustrating the shears as the parts will appear when the shears is in operation;

Figure 2 is a top plan view partly in horizontal section thereof;

Figure 3 is an end view of the shears looking from left to right of Figures 1 and 2;

Figures 4 and 5 are cross sectional views of the shears taken substantially along planes as indicated by the lines 4—4 and 5—5, respectively, of Figure 1;

Figure 6 is a perspective view of the motor shaft cam;

Figure 7 is a plan view of the stationary shear blade, and

Figure 8 is a plan view of the movable shear blade.

Referring more specifically to the drawing, the novel electric shears in its entirety is designated generally 10 and includes a hollow handle portion 11 forming a casing and support for the parts. The hollow handle or casing 11 is preferably cylindrical in cross section and includes an elongated barrel 12 which is closed at one end by a cap 13 and at its opposite end by a cap 14. The caps 13 and 14 are preferably substantially hemispherical in shape and are preferably connected by screw fastenings 16 or otherwise as by a press fit connection at the joints 15 of the barrel and caps.

A pair of supports 17 are mounted within the barrel 12 and secured thereto by fastenings 18 in longitudinal alignment. The supports 17 are secured to longitudinal spaced portions of the casing 19 of an electric motor 20 by additional fastenings 18 for mounting the electric motor 20 longitudinally in the casing 10 and substantially axially thereof. The motor 20 is provided with an armature shaft 21 extending from the forward end of the casing 19 having a distal portion 22 of noncircular cross section extending into the cavity of the front cap 13.

The rear cap 14 is provided with a boss 23 through which encased portions of a pair of electrical conductors 24 and 25 extend. The conductor 25 is connected to one of the contact posts 26 of the electric motor 20. The conductor 24 is electrically connected to a blade 27 forming the variable contact of a rheostat, designated generally 28. The winding 29 of the rheostat 28 is supported by a curved arm 30 and is connected to one end of an electrical conductor 31, the opposite end of which is connected to the other motor contact 26a. The arm 30 is suitably secured to the inner surface of the barrel 12 and extends inwardly therefrom. The rheostat blade 27 constitutes one arm of a bell crank 32 which is pivotally mounted at its apex at 33 on a bracket 34 which is secured to and extends inwardly from a portion of the barrel 12. The other slotted arm 35 of the bell crank 32 is longer than the arm or blade 27 and extends forwardly from the pivot 33.

A push button or head 36 is disposed externally of the barrel 12 and has a neck 37 extending from its inner side slidably and nonrotatably through an opening 38 of the barrel 12. A crosshead 39 is formed on or secured to the inner end of the neck 37 and is disposed longitudinally of the casing 11. A bar 40 extends transversely across and is secured within the barrel 12 between the forward end of the electric motor 20 and the crosshead 39 and provides a seat for one end of an expansion spring 41, the opposite end of which bears against the inner side of the crosshead 39 to urge the crosshead, neck 37 and head 36 outwardly with respect to the barrel 12. The brace 40 and crosshead 39 are provided with teats 42 which project therefrom into the ends of the spring 41 to resist distortion of the spring when compressed. A pin 43 which projects from the rear end of the crosshead 39 slidably engages the slot of the bell crank arm 35.

A bracket 44 is secured to the barrel 12 adjacent its forward end and provides a support for a shaft 45 which is disposed transversely of the barrel forwardly of the crosshead 39. A bell crank 46 is journalled at its apex on the shaft 45 and has a rearwardly extending slotted arm 47, the slot of which is slidably engaged by a pin 48 which is fixed to and projects laterally from the forward end of the crosshead 39. A cam 49 is slidably and non-turnably mounted on the noncircular shaft portion 22 for turning movement with the motor shaft 21 and for sliding movement relatively thereto. The cam 49 is provided with a rounded eccentric portion 50 which is larger at the rear end of said cam and which diminishes toward and terminates rearwardly of the forward end of the cam. The forward end portion of the cam which is substantially circular is provided with an annular outwardly opening groove 51 to receive the forked or bifurcated distal end 52 of the other, longer arm 53 of the bell crank 46 that extends downwardly and forwardly from the shaft 45 and which is curved downwardly.

The front cap 13 has an elongated slot 54 formed in the central portion thereof and is provided with an internally thickened portion 55 disposed inwardly of said slot 54 and partially in alignment therewith. A stationary shear blade 56 is provided with a transverse shank 57 at its inner end which abuts against a wall 58 of the enlargement 55 and which is secured thereto by fastenings 59 which extend through openings 60 in the ends of the shank 57 and which are anchored in the enlargement 55. The blade 56 is thus supported at its inner end within the cap 13 with the blade portion 61 thereof extending outwardly through the slot 54.

A movable shear blade 62 is provided with a transverse shank 63 at its inner end which, like the shank 57 projects transversely from the cutting edge of said blade. The shank 63 is provided with a single opening 64 intermediate of its ends which is positioned in alignment with an intermediate opening 65 of the shank 57 to receive a fastening 66 which extends through the openings 64 and 65 and is anchored in the enlargement 55 to pivotally mount the blade 62 in the cap 13 and with the blade portion thereof extending outwardly through and being swingably disposed in the slot 54. The shank 63 is provided at its free end with an extension 67 which is offset relatively to the blade portion 68 of the movable shear blade 62 and which extends in a direction away from the blade portion 68 and inwardly of the cap 13. The outer edge of the extension 67 is provided with a notch 69 and said extension terminates therebeyond in a restricted stem 70. A roller 71 is journalled on the stem 70 and is retained thereon by a collar 72. One end of a leaf spring 73 is secured against a portion of the inner side of the barrel 12 by fastenings 74. The spring 73 extends longitudinally of the barrel 12 and has an upwardly curved free end 75 which engages the notch 69, said spring except for its secured end being spaced from the wall of the barrel 12 and cap 13. The spring 73 is relatively strong and the free end thereof is spring biased toward the axis of the barrel to exert a thrust against the extension 67 to cause the blade 62 to swing on its pivot 66 in a counterclockwise direction, as seen in Figure 1, so that the cutting edge 68a of the blade 62 will move across the cutting edge 61a of the blade 56 for executing a shearing or cutting stroke of the shear blade. Said cutting edges 61a and 68a being formed by the blade portions 61 and 68 being bevelled on opposite sides thereof, as is conventional in scissors and shears. From the foregoing it will be readily apparent that the spring 63 will normally move the blade 62 to a closed position.

It will be understood that the covered portions of the conductors 24 and 25 which extend outwardly from the rear cap 14 are connected in a conventional manner to a male electric plug, not shown, which is adapted to be plugged into a conventional electrical outlet, not shown, for supplying current to the electric motor 20. Such a connection can be made without the motor 20 being energized as the spring 41 normally holds the parts 36, 37, 39 outwardly with respect to their positions of Figure 1, so that the bell crank 32 is rocked clockwise from its position of Figure 1 so that the rheostat blade 27 is disposed beyond the forward end of the rheostat winding 29 and consequently current will not flow through the rheostat 28 to the electric motor 20. Likewise, in this outwardly displaced position of the parts 36, 37, 39, the bell crank 46 is turned counterclockwise from its position of Figure 1 so that its arm 53 is swung rearwardly or to the right to displace the cam 49 inwardly on the shaft portion 22 toward the motor 20 so that the cam will not engage the roller 71. The operator grasps the hollow handle or casing 11 with either hand as preferred and while thus supporting the electric shears 10 may conveniently press the thumb of the hand supporting the shears against the head or button 36 to displace the parts 36, 37, and 39 inwardly of the barrel 12. As the crosshead 39 moves inwardly the bell crank 32 is rocked counterclockwise thereby and the bell crank 46 is rocked clockwise. This movement of the bell crank 46 causes the fork 52 of the arm 53 to displace the cam 49 forwardly toward its position of Figure 1. However, before the cam 49 is moved sufficiently so that its eccentric portion 50 can engage the roller 71, the rheostat blade 27 will have swung counterclockwise sufficiently toward its position of Figure 1 to energize the electric motor 20 and to permit sufficient current to pass through the rheostat 28 to partially accelerate the motor before the motor shaft 21 is placed under load, as will hereinafter be described. Further inward movement of the crosshead 39 by continued pressure on the head or button 36 will increase the acceleration of the motor 20 and will result in the cam 49 being displaced forwardly sufficiently so that as said cam revolves with the shaft portion 22 the eccentric portion 50 will strike the roller 71 with each revolution of the shaft 21 to swing the blade 62 clockwise, as seen in Figure 1, on its pivot 66 to an open position as illustrated in Figure 1. This will also load the spring 73 so that when the eccentric portion 50 moves out of engagement with the roller 71 the loaded spring 73 will forcibly swing the blade 62 in the opposite direction or counterclockwise, back to a closed position of the shear blades for executing a cutting stroke. In view of the taper of the eccentric portion 50 away from its rear end, it will be apparent that the further the crosshead 39 is displaced inwardly of the barrel 12, the further the cam 49 will be moved forwardly of the barrel, and it will be readily apparent that the further the cam 49 is moved forwardly the further the blade 62 will be swung toward an open position since the roller 71 will then engage the larger rear portion of the eccentric 50 which is located more remote to the shaft portion 22 than the forward part of the eccentric 50. Likewise, the further the blade 62 is swung toward an open position the more the spring 73 will be loaded and to overcome this spring resistance the motor is further accelerated by the blade 27 being moved from left to right of Figure 1 relatively to the rheostat winding 29 as the cam 49 is displaced forwardly.

It will thus be apparent that the single manually actuated push button control 36 functions to initially energize the electric motor 20, to accelerate the motor for controlling the speed of operation of the movable shear blade 62 and additionally for varying the extent of opening of said shear blade. It will also be noted that the power for the cutting stroke of the movable blade 62 is furnished by the spring 73 so that no damage will result to any of the parts should the cutting edges of the blades strike an obstruction through which the blades could not cut resulting in the blade 62 failing to complete its movement to a closed position.

Various modifications and changes are contemplated and may obviously be resorted to, without departing from the spirit or scope of the invention as hereinafter defined by the appended claims.

I claim as my invention:

1. A power operated shears comprising a hollow handle, an electric motor contained therein having a rotary driven shaft extending toward one end of the housing, a stationary shear blade secured to and projecting from said housing end, a movable shear blade pivotally mounted in and extending from said housing end having a cutting edge movable back and forth across the cutting edge of the stationary shear blade when the movable shear blade is rocked in opposite directions about its pivot, a cam having an eccentric portion slidably and non-turnably mounted on the motor shaft for rotation therewith, said movable blade having an extension engageable by the cam eccentric when revolved for swinging the movable blade away from the stationary blade to an open position, circuit controlling means mounted in the housing for energizing and deenergizing the electric motor, a cam actuator pivotally mounted in the housing and connected to the cam for moving the cam toward and away from the movable blade extension, a manually actuated control unit connected to the circuit controlling means and the cam actuator for initially moving the circuit control means to a circuit closing position and for thereafter moving the cam actuator to displace the cam to an operative position when the manual control means is displaced inwardly of the housing, and spring means bearing against the movable blade extension and urging said movable blade toward a closed position.

2. An electric shears as in claim 1, and a spring bearing on and normally urging the manually actuated unit outwardly of the housing for moving the circuit control means to an open position and for causing the cam to be moved by the cam actuator to an inoperative position.

3. An electric shears as in claim 1, said circuit control means comprising a rheostat including a pivotally mounted movable rheostat element connected to the manually actuated unit for varying the amount of current passing through the rheostat to the electric motor.

4. An electric shears as in claim 1, said cam eccentric being tapered in a direction longitudinally of the motor shaft from a rear end of the cam located adjacent the motor shaft whereby the extent of opening of the movable blade will be varied by the extent of movement of the cam on the motor shaft.

5. An electric shears as in claim 4, a roller journalled on said movable blade extension and disposed to be engaged by the cam eccentric when the cam is moved to an operative position by the cam actuator.

6. An electric shears as in claim 1, said manually actuated unit comprising a neck extending through a portion of the handle and slidably disposed for radial movement relatively thereto, a head on the outer end of said neck disposed externally of the handle and adapted to be manually engaged and displaced inwardly toward the housing, and a crosshead fixed to the inner end of the neck and disposed within the handle having one end connected to a part of the circuit control means and its opposite end connected to the cam actuator.

7. An electric shears as in claim 6, said part of the circuit control means and said cam actuator each comprising a bell crank having a slotted arm slidably connected to the cross-head.

8. An electric shears comprising a housing, a fixed blade secured therein and projecting therefrom, a movable blade pivotally connected to the housing having a cutting edge disposed for movement back and forth across the cutting edge of the fixed blade when the movable blade is rocked in opposite directions, spring means urging the movable blade toward a closed position, a driven cam having an eccentric portion engaging and moving the movable blade to an open position, means controlling the speed of rotation of the cam, a cam actuator for moving the cam into and out of an operative position, and a manually actuated control unit connected to the speed control means and cam actuator for variably controlling the speed of rotation of the cam and the portion of the cam engaging the movable blade for varying the speed of operation of the movable blade and the extent of opening thereof.

RAY O. HOOKER.

No references cited.